A. F. MESTON.
APPARATUS FOR PRECIPITATING SUSPENDED PARTICLES FROM GASES.
APPLICATION FILED FEB. 23, 1918.
1,357,886.
Patented Nov. 2, 1920.
2 SHEETS—SHEET 2.
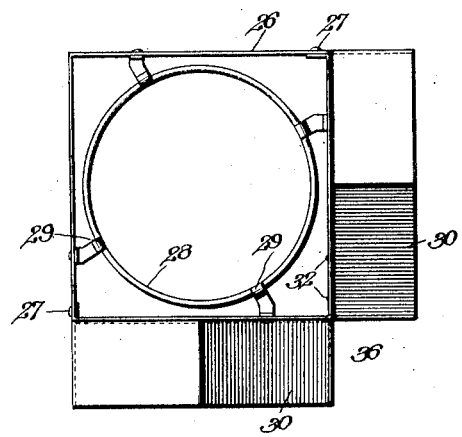
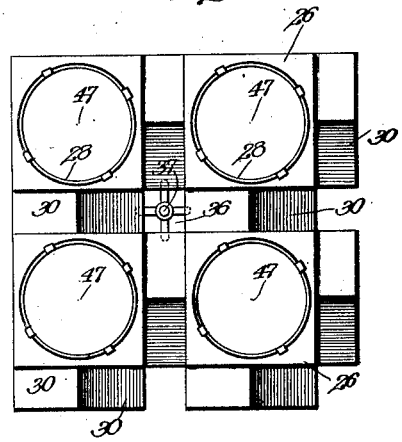
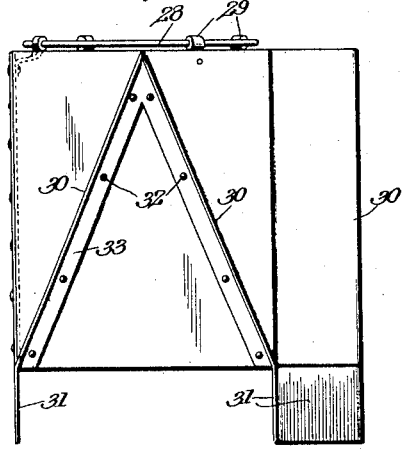
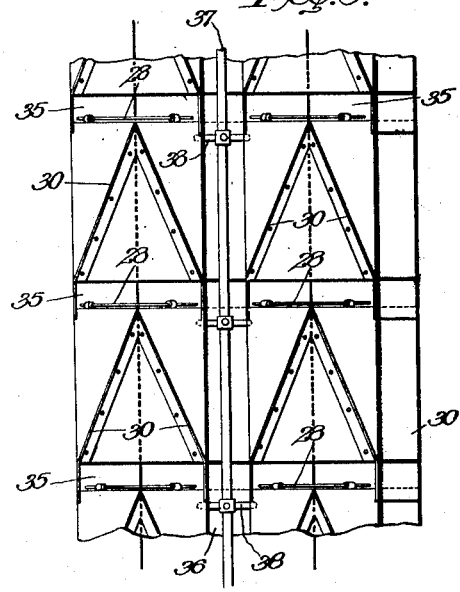
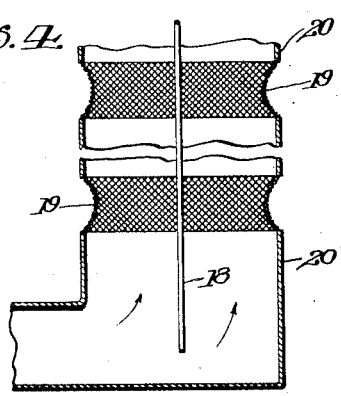
Inventor
Archibald F Meston
By Bynes Townsend & Brickenstein
Attorneys

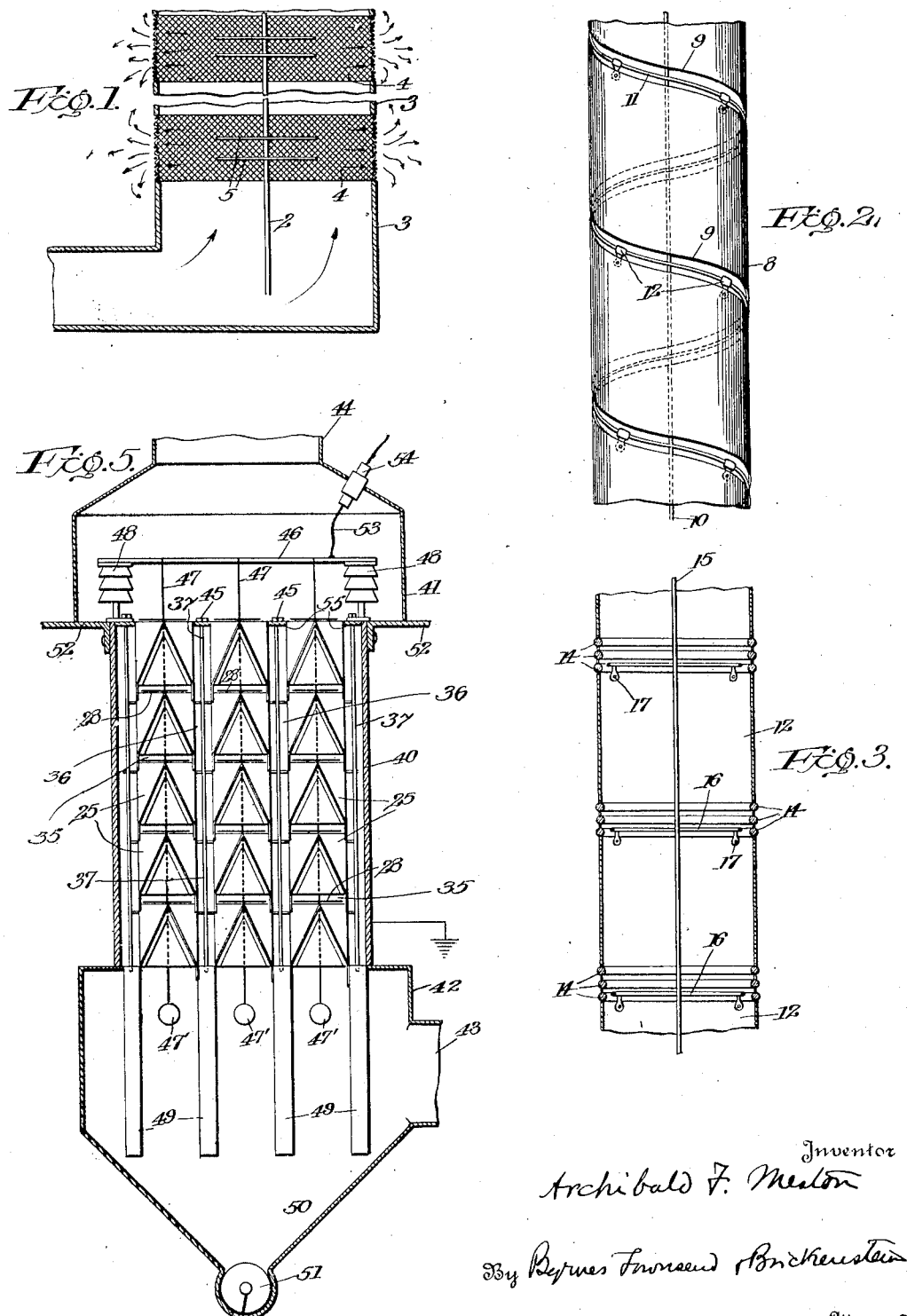

UNITED STATES PATENT OFFICE.

ARCHIBALD F. MESTON, OF NEW YORK, N. Y., ASSIGNOR TO RESEARCH CORPORATION, OF NEW YORK, N. Y., A CORPORATION OF NEW YORK.

APPARATUS FOR PRECIPITATING SUSPENDED PARTICLES FROM GASES.

1,357,886.  Specification of Letters Patent.  Patented Nov. 2, 1920.

Application filed February 23, 1918. Serial No. 218,793.

*To all whom it may concern:*

Be it known that I, ARCHIBALD F. MESTON, a citizen of the United States, residing at New York, in the county of New York and State of New York, have invented certain new and useful Improvements in Apparatus for Precipitating Suspended Particles from Gases, of which the following is a specification.

The present invention relates to apparatus for the treatment of gases to remove by electric action dust, fume, soot, mist or other particles suspended therein.

It is the object of the invention to generally improve the efficiency of electric precipitators.

Another object is to provide an apparatus of the character referred to from which the precipitated particles are easily removed.

The more particular object is to make use of the electric wind produced in this class of apparatus for more effectively removing the suspended particles.

In apparatus for precipitating dust, etc., from gases by electric action, the gases are passed between electrodes which are maintained at a high potential difference to produce a field of intense electric stress therebetween. As the gases pass through this field, the particles become charged and migrate away from one electrode, termed the discharge electrode, toward the other electrode, termed the collecting electrode. The particles are propelled in this direction with considerable force and adhere to the collecting electrode, thus forming a deposit thereon which must be from time to time removed by knocking, jarring, scraping, flushing or in other ways, as is well known.

It is also well known that the field of electric stress is not uniform due to irregularities on the electrodes, principally the collecting electrodes. Such irregularities, as slight projections, bulging portions, etc., cause the field to be more concentrated at such points than at others which in turn leads to non-uniform deposition of the particles on the walls of the collecting electrodes.

Another, quite serious disturbance on the process of precipitation under these circumstances is caused by the local eddies or currents of the electrical wind. While theoretically, in the use of a precipitator in which the electrodes are absolutely uniformly spaced throughout the treater chamber, the electric wind would be probably also uniform throughout the chamber, it is evident that such ideal condition cannot be materialized. There are distinct mechanical limitations to accuracy and precision and there are factors in the operation of apparatus of that kind which are beyond the control of mechanical skill. One slight irregularity will produce another and so on.

In order to overcome these various disadvantages it is proposed to so construct the precipitating apparatus that the effect of the irregularities inherent in the mechanical structure is reduced to a reasonable minimum and that simultaneously a concentrated zone of electric wind is produced which is substantially uniform in its action. In addition to that it is proposed to so arrange the construction that the greater part of the particles which are forced laterally of the gas flow by the electric forces may be permanently removed from the gas stream.

In order to facilitate a fuller understanding of the invention, reference is had to the appended drawings in which—

Figure 1 is a fragmentary sectional view of a precipitator constructed according to the invention;

Fig. 2 a fragmentary view of a modification;

Fig. 3 a fragmentary sectional view of another modification;

Fig. 4 a fragmentary sectional view of still another modification;

Fig. 5 a vertical sectional view of an apparatus embodying a specific application of the principle governing the invention;

Figs. 6 and 7 are plan view and elevation respectively of a sectional unit forming part of the device shown in Fig. 5 and Figs. 8 and 9 are plan view and elevation respectively of a part of the structure showing the compounding of the device from a plurality of sectional units such as shown in Figs. 6 and 7.

In Fig. 1 is shown a portion of a treater chamber in section. 2 is the discharge electrode extending through a tubular body defining a cylindrical passage. This tubular body which is the collecting electrode consists of alternate sections 3 and 4 which are imperforate and perforate respectively. Opposite the perforate sections the discharge electrode 2 is provided with a disk or disks 5 of electrical conducting material. Since the distance between the edge of each of these disks to the wall of the collecting electrode is smaller than that between the wire and the wall, a more concentrated electrical field of stress is produced in the zone defined by the disks 5 and the perforate wall 4 than in other parts of the treater. As the gas passes into this zone, the particles suspended therein, or at least a large proportion thereof, are propelled with relatively great force toward the wall of the treater and pass through the interstices or perforations thereof. Some of these particles, carrying a charge of the sign of the discharge electrode, are attracted to and settle on the outer wall of the imperforate portions 3. Others being forced such a distance from the walls 3 that the force of mutual attraction is not sufficient to return them to the walls 3, fall by gravity. Others may have lost their charge so that they fall likewise by gravity outside the walls of the treater.

Some of the particles, although a relatively small percentage, settle on the inner wall of the imperforate portions 3. The same action takes place through the various sections of the treater. The arrows in the figure indicate the line of travel of the particles.

Fig. 1, as also Figs. 2, 3 and 4 are more or less diagrammatical and intended principally to explain the principle on which the invention is based. It is understood that the treater chamber must be surrounded by a substantially air-tight casing to prevent the gases from passing into the open, as will be more particularly explained in connection with Fig. 5. Such casing may be used as a collecting chamber for the particles discharged through the perforated wall portions 4.

Suitable jarring devices may be used, as is well understood in the art, for dislodging the deposit within and without the treater chamber.

Fig. 2 shows a tubular body 8 having a portion of the wall removed in the form of a spiral as indicated at 9. This body 8 is the collecting electrode and the spiral opening corresponds to the perforate portion in Fig. 1. While a perforate portion or screen might be used, as in Fig. 1, such screen is not necessary, where the opening is made sufficiently narrow. A discharge electrode, in the form of a thin wire 10 extends centrally through the tubular body 8. In order to produce a field of intense stress opposite the spiral openings 9, a wire or strip 11 is attached to the tubular body in the form of a spiral corresponding to the spiral opening 9. This strip or wire 11 is attached to the tubular body by means of clasps or braces 12 to hold it a slight distance from the walls of the body 8 and thereby form a slight constriction of it. By this arrangement the field of electric stress between the two electrodes has a spiral zone of greater intensity and radially outwardly from said zone is an open space in the collecting electrode through which the particles are shot as before explained.

Fig. 3 shows a plurality of imperforate preferably tubular sections 12 vertically spaced from each other and the spaces intermediate the sections 12 occupied by rings 14. These rings are slightly spaced to define narrow passages therebetween as an equivalent of the perforations in Fig. 1. The several sections and rings may be suitably interconnected to preserve the spacing. A convenient way of combining the parts to a unitary structure is by means of chains (not shown) as is obvious. A discharge electrode 15 preferably of fine wire extends centrally of the cylindrical passage defined by the tubular sections 12. Rings 16 of thin wire or a material presenting a sharp edge and of a smaller diameter than the tubular sections are attached to the tubular sections adjacent their upper edge as by clasps or braces 17.

By this arrangement the field of electric stress between the tubular sections 12 and the rings 16 on the one hand, which constitute the collecting electrode, and the wire 15 has zones of greater intensity in the planes of the rings 16 and the narrow passages leading to the space outside the collecting electrode.

The device shown in Fig. 4 is similar to that disclosed in Fig. 1. However, the discharge electrode 18 is a thin wire and the perforate sections 19 intermediate the imperforate sections 20 are curved inwardly to form a constriction of the cylindrical passage defined by the imperforate sections. In this manner the field of electric stress between the two electrodes has zones of greater intensity in the planes of the curved perforated sections 19. The electric action is the same as before described.

The device shown in Fig. 5 is composed of a plurality of flues constructed on the general principle embodied in Figs. 1–4. Each flue is made up of a plurality of sections 25 forming the collecting electrode. Each section 25 consists of a box member 26 which in this particular design is square in cross-section and open at the ends. These box members 26 may be made in any convenient way. In the particular construction they are made in two halves fastened together by rivets 27. Rings 28, similar to the rings 16 described in connection with Fig. 3 are fastened to the sides of the box members 26 at the upper end thereof to define constrictions. These rings 28 may be attached by bands 29, as shown, or in any other suitable manner.

To certain sides of the box members 26, for a purpose to be subsequently described, are fastened flanges 30 in the form of steep roofs having their apexes approximately on the medial vertical line of the sides and terminating adjacent the lower corners of the box member. At their lower ends these flanges are bent to form vertically depending extensions 31. These flanges may be attached to the box members in any conventional manner as by rivets 32 passing through bent-over portions 33 and the sides of the box members.

The box members are assembled to form a plurality of flues adjacent each other as indicated in Figs. 8 and 9. The free side of one element abuts against the flange 30 of its neighbors and vice versa thereby leaving a square space 36 between each group of four elements.

In order to vertically space the various box members 26 forming each flue to define an open space 35 therebetween similar to the open spaces in the electrodes shown in Figs. 1-4 for the passage of the electrified particles to the space outside the flues, a rod 37 is extended into the square spaces 36 left by the different horizontal groups of box members 26. This rod is provided with equally spaced pegs or pins 38 extending laterally thereof to support the various vertically arranged box members. The flange extensions 31 are provided to form walls for inclosing the space 36. The longer these extensions are, the larger a portion of the space 36 is made into a rectangularly defined passage and the more tortuous is the path for the gas, should it tend to escape from the main gas passages. There are as many rods 37 as there are spaces 36. The rods may be suitably supported in any desired manner.

In Fig. 5, which shows a complete apparatus built in the manner indicated in Figs. 6-9, 40 is a casing entirely surrounding the plurality of flues, of which there are three rows. 41 is an upper manifold and 42 a lower manifold. The casing and the manifolds comprise a substantially air tight chamber in which the rows of flues are inclosed. Into one of the headers or manifolds, in the present case 42, the gases are conducted by an inlet pipe 43. From the other manifold the cleaned gases are conducted away through an outlet pipe 44 either into the atmosphere or to a place for further use.

Across the top of the casing 40 and supported thereon are a number of beams 45 from which the rods 37 are suspended. Mounted on the top of the casing 40 is also a frame 46 for supporting the discharge electrodes 47. This frame 46 is carried on insulators 48 in the usual manner. The discharge electrodes are shown as extending through the flues and weighted at the bottom by weights 47' to keep them taut.

From the lower end of the vertical channels defined by the square spaces 36 chutes 49 extend into a hopper 50 and at the bottom of the hopper a conveyer 51 is provided for removing the material collected in the hopper.

The whole structure may be supported in any preferred manner as by steel beams or girders 52. The electrode frame may be connected in the usual way to a source of high tension current supply by a feed wire 53 passing through an insulator 54 in the wall of the manifold 41. The collecting electrode system is grounded as usual.

It may be found desirable to close the top of the channels defined by the spaces 36 against flow of gas, as for instance by strips 55.

The gases pass into the lower manifold through pipe 43, are distributed therein and ascend in the different flues. As they pass through the field of electric stress the suspended particles are charged and migrate toward the collecting electrode. The particles reaching the zones of greater intensity are subjected to increased electric action and a part of them is forced by the electric wind out through the open spaces into the space between the box members 26. As the gases successively pass the different zones of intense electric stress, the action is repeated until the gas is sufficiently clean.

It is to be noted that the passages 35 are made quite narrow so that they offer a high resistance to the gas, while the cross-section of the flues is such as to offer little resistance to the gases.

Sometimes it may be desirable to have a slight pressure drop through each passage in the walls of the flues, because this brings about a more equal distribution of the gases in the different flues.

Some of the particles expelled from the gas stream and shot through the lateral openings fall down the channels 36, but most of them form a deposit upon the roof shaped flanges 30, from which they may be easily dislodged by rapping. Since all flanges lead into the square space 36, the particles pass down these square channels, through the chutes 49 into the hopper 50 from which they may be removed by the conveyer 51.

Since the chutes 49 extend into the hopper, the current of incoming gas cannot flow into and up the channels 36 and cannot interfere with the collection of the particles nor with the electric wind forcing the particles through the lateral openings of the flues.

Suitable mechanism may be provided for rapping or jarring the flues, as is usual in devices of this character.

It is understood that the invention may be carried out in various other ways.

In the claims the term "perforate" is used not only to denote distinct perforations in the ordinary sense, but open space in general.

I claim:—

1. In apparatus for the electric treatment of gases, the combination of a flue having a perforate and an imperforate section, means for producing transversely of said flue a field of electric stress and means for intensifying said field adjacent the perforate section.

2. In apparatus for the electric treatment of gases the combination of a flue having alternating perforate and imperforate wall portions, means for producing transversely of said flue a field of electric stress and means for intensifying said field adjacent the perforate portions.

3. In apparatus for the electric treatment of gases, a collecting electrode composed of a plurality of alternating perforate and imperforate flue sections assembled to form a flue for the gases, a discharge electrode extending into said flue and means connected to one of said electrodes adjacent the perforate sections to reduce the dielectric distance between the electrodes.

4. In apparatus for the electric treatment of gases, a collecting electrode composed of a plurality of flue sections, means for holding said sections in spaced relation to define open spaces therebetween, a discharge electrode extending into said flue sections and means on one of said electrodes for reducing the dielectric distance between the electrodes adjacent said open spaces.

5. In apparatus for the electric treatment of gases, a collecting electrode composed of a plurality of flue sections, means for holding said sections in spaced relation to define open spaces therebetween, a discharge electrode extending into said flue sections and means on the flue sections adjacent the open spaces to reduce the dielectric distance between the electrodes.

6. In apparatus for the electric treatment of gases, a collecting electrode composed of a plurality of flue sections, means for holding said sections in spaced relation to define open spaces therebetween, a discharge electrode extending into said flue sections and means on the flue sections concentric with the discharge electrode to reduce the dielectric distance between the electrodes adjacent the open spaces.

7. In apparatus for the electric treatment of gases, a collecting electrode composed of a plurality of flue sections, means for holding said sections in spaced relation to define open spaces therebetween, a discharge electrode extending into said flue sections and means on the flue sections constructed and arranged to present a sharp edge to the discharge electrode and concentric therewith for reducing the dielectric distance between the electrodes adjacent the open spaces.

8. In apparatus for the electric treatment of gases, a collecting electrode composed of a plurality of flue sections, means for holding said sections in spaced relation to define open spaces therebetween, a discharge electrode extending into said flue sections and a ring at the end of each flue section concentric with the discharge electrode for reducing the dielectric distance between the electrodes adjacent the open spaces.

9. In apparatus for the electric treatment of gases, a collecting electrode composed of a plurality of box members, means for supporting the box members in a superposed relation to form a flue, but in spaced relation to define relatively narrow open spaces, a discharge electrode extending into said flue and means at the end of each box member and concentric with the discharge electrode for reducing the dielectric distance between the electrodes.

10. In apparatus for the electric treatment of gases, a plurality of spaced flues forming collecting electrodes, said flues being composed of a plurality of imperforate and perforate sections, a discharge electrode extending into each of the flues, means adjacent the perforate sections for reducing the dielectric distance between the collecting electrode and the discharge electrode of each flue, means for passing gas through the flues and means for reducing the tendency of the gas to pass between the flues.

11. In apparatus for the electric treatment of gases, a plurality of spaced flues forming collecting electrodes, said flues being composed of a plurality of imperforate and perforate sections, a discharge electrode extending into each of the flues, means adjacent the perforate sections for reducing the dielectric distance between the collecting electrode and the discharge electrode of each flue, means for passing gas through the flues, a collecting chamber and means for connecting the space intermediate the flues with the collecting chamber, said means tending to prevent access of the gas into the said space.

12. In apparatus for the electric treatment of gases, a plurality of flues forming collecting electrodes, each of said flues being composed of a plurality of box members, means for spacing the said members of each flue to define relatively narrow open spaces, means for holding the flues in spaced relation, means for constricting the space between the flues transversely thereof to reduce the tendency of the gas to flow between the flues.

13. In apparatus for the electric treatment of gases, a plurality of flues forming collecting electrodes, each of said flues being composed of a plurality of box members, means for spacing the said members of each flue to define relatively narrow open spaces, and means for holding said flues in spaced relation and constricting the space between the flues.

14. In apparatus for the electric treatment of gases, a plurality of flues forming collecting electrodes, each of said flues being composed of a plurality of box members, means for spacing the said members of each flue to define relatively narrow open spaces, and transversely extending downwardly inclined webs for spacing the flues and constricting the space between the flues.

15. In apparatus for the electric treatment of gases, a plurality of flues forming collecting electrodes, each of said flues being composed of a plurality of box members, means for spacing the said members of each flue to define relatively narrow open spaces, and transversely extending webs for spacing the flues and constricting the space between the flues, the webs between adjacent flues of each group of four flues being downwardly inclined to a common opening.

16. In apparatus for electrically treating gases, a box member open at both ends, a roof shaped flange on a side of the box member, said flange having its apex near one open end and its free ends near the other open end of the box member.

17. In apparatus for electrically treating gases, the combination of a plurality of box members open at opposite ends, an inclined flange on a side of each box member so disposed between the open ends of the box member that, when the box members are symmetrically arranged in groups of four, the flanges are symmetrically inclined toward each other and form a common opening centrally of the group.

18. In apparatus for electrically treating gases, the combination of a box member open at opposite ends, said box member being of electrical conducting material, a ring shaped metallic member at one open end of the box member and connected thereto for constricting said opening and a flange on a side of the box member extending from near one open end of the box member in diagonal direction toward the other open end.

In testimony whereof I affix my signature in presence of two witnesses.

ARCHIBALD F. MESTON.

Witnesses:
JOHN C. HALE,
JESSE HUFF.